April 16, 1968

F. A. MARTIN 3,377,943

DEVICE FOR TOASTING THE INTERIOR OF BUNS

Filed Sept. 22, 1966

INVENTOR
Frank Alleyne Martin
by McDougall, Hersh, Scott
and Ladd
Attys 3,377,943
DEVICE FOR TOASTING THE INTERIOR OF BUNS Frank Alleyne Martin, Park Ridge, Ill.
(8 S. Michigan Ave., Chicago, Ill. 60603)
Filed Sept. 22, 1966, Ser. No. 581,331
1 Claim. (Cl. 99—419)

ABSTRACT OF THE DISCLOSURE

The invention is addressed to an appliance in the form of a toaster for heating the interior surfaces of buns in which the appliance is formed of one or more metal spikes on which the buns are impaled and a housing having a top wall formed with a recess extending downwardly from the surfaces thereof into which the base portion of the spike extends so as to provide an annular space all around the spike between the base portion of the spike and the recessed portion of the housing to enclose the outer walls of the bun when impaled onto the spike and in which the well is formed to a depth less than one-half the height of the spike so that the upper end portion of the spike will extend beyond the top wall of the housing with the base of the spike being insulated from the well portion of the housing to prevent the transfer of heat from the spike to the housing.

---

This invention relates to an electrical appliance for heating the interior of buns or the like and it relates more particularly to a toaster on which the interior surfaces of the bun can be toasted.

In U.S. Patent No. 2,648,275, description is made of a bun toaster for toasting the interior of a bun by impaling the bun on a metal spike heated to elevated toasting temperature whereby heat transfers from the spike to the adjacent surfaces of the bun to effect the desired toasting operation.

Difficulties have been encountered in use of equipment of the type described, particularly with respect to the ability to maintain the adjacent interior surfaces of the impaled bun in sufficiently close proximity to the heated surfaces of the spike for maximizing heat transfer whereby the bun surfaces are raised to toasting temperature in minimum time and at minimum expense. Difficulties have also been encountered in holding the bun tightly onto the heated spike in order to effect uniform toasting over the inner surfaces of the bun.

A still further problem that has been encountered in the use of an appliance of the type described resides in the danger of the operator being burned by the hot spike by reason of the projection of the spike for its full length from the surface of the appliance whereby it projects into the pathway of the operator's hands or arms in use.

It is an object of this invention to produce an electrical appliance of the type described which embodies means to force the bun tightly to embrace the heated spike for effecting rapid and uniform toasting of the interior surfaces of the bun; which embodies means for embracing the outer walls of the bun, when impaled on a spike, to prevent excessive opening of the bun during the toasting operation; which embodies means whereby the bun is retained in position to be heated by the spike for the toasting of the interior surfaces thereof notwithstanding the possible separation of the bun during toasting or separation prior to toasting; which is reduced in the distance that the spike projects from the surface thereby to minimize the danger of being burned by inadvertent contact with the spike, and it is a related object to produce a bun toaster of the type described which is simple in construction and easy in operation, which can be constructed of relatively few, readily available parts and materials to form a sturdy, rugged appliance capable of home or restaurant use, and which is of low cost and efficient operation.

These and other objects and advantages of this invention will hereinafter appear and for purposes of illustration, but not of limitation, an embodiment of the invention is shown in the accompanying drawing in which—

Figure 1:
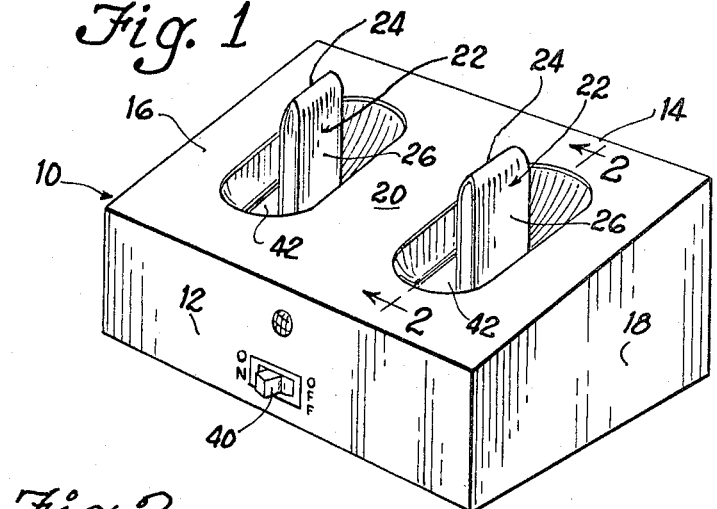
FIG. 1 is a perspective elevational view of a bun toaster embodying the features of the invention.
Figure 2:
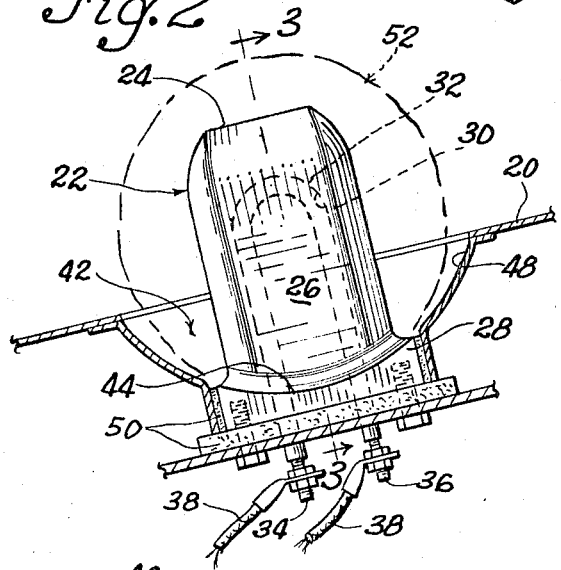
FIG. 2 is a sectional view taken along the line 2—2 of FIG. 1.
Figure 3:
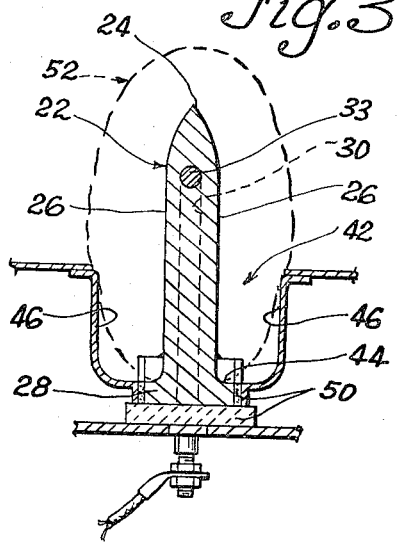
FIG. 3 is a sectional view taken along the line 3—3 of FIG. 2.
Figure 4:
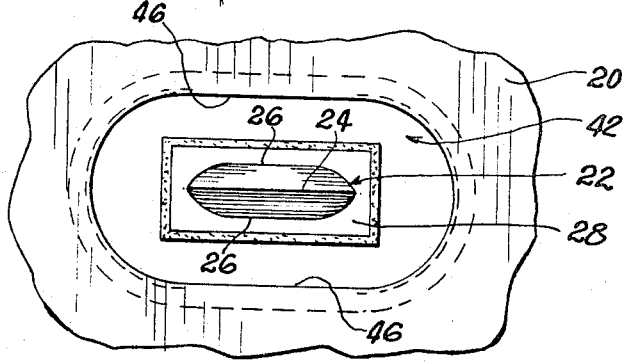
FIG. 4 is a top view of FIG. 2.

In the drawing, illustration is made of a bun toaster embodying the features of this invention comprising a rectangularly shaped housing 10 having a front wall 12, a back wall 14, side walls 16 and 18, and a top wall 20, which is disposed at a slight upward incline from the front edge to the back edge.

The toasting elements, hereinafter referred to as spikes 22, are fabricated of a metal having a high heat transfer coefficient, such as of aluminum, stainless steel, copper, or the like material, preferably, although not necessarily, surface treated with a release agent, such as Teflon, silicone, or the like. In the illustrated modification, the appliance is shown with two spikes extending vertically upwardly from the top wall but it will be understood that the concepts of this invention include appliances having one or a plurality of such spikes arranged in spaced apart relationship with the top wall of the appliance.

The spike 22 is shaped to correspond to a steeple in cross-section with a relatively sharp upper edge 24 tapering outwardly for a short distance to upright side walls 26 which extend downwardly to a base 28 and in which the spike is dimensioned to have an overall height slightly less than the maximum cross-sectional dimension of a bun and preferably a height within the range of 4 to 7 inches, and a length, from the forward edge to the rearward edge, which is slightly less than the width of a bun and preferably in the range of from 2 to 4 inches.

The interior of the spike is provided with electrical heating elements such as a Calrod unit or a resistance unit. In the illustrated modification the spike is formed with a channel 30 of inverted U-shape dimensioned to receive a U-shaped electrical heating element 32 in fitting relationship therein with the contacts 34 and 36 extending downwardly beyond the base for engagement by connecting wires 38. The latter are in turn connected to switch members having a switch button 40 extending outwardly from the front wall for operation between "on" and "off" positions with the switch members being connected to a source of electrical energy.

In accordance with the practice of this invention, the top wall 20 of the housing is formed with laterally spaced apart wells 42 corresponding in number to the number of spikes. Each well is dimensioned to have a depth less than the height of the spike and preferably less than one-half the height of the spike but more than one-fourth the height, and each well is formed with a bottom wall 44 which may be flat but which is preferably formed to a curvilinear shape from the front edge to the back edge and with flat side walls 46 and curvilinear end walls 48 extending vertically upwardly from the bottom wall with the side walls being spaced from the adjacent walls of the spike by an amount slightly greater than one-half the thickness of the bun or a distance of about ½ to 1 inch and with the end walls 48 being spaced from the corresponding walls of the spike by an amount whereby the well will accommodate the width of the bun or about 1 to 1½ inches from the end walls of the spike. The spike rests on a thermally insulated plate 50 adjacent the bottom wall of the well whereby the lower end portion of the spike extends into the well with an enclosed annular space all around.

When the bun 52, with or without previous slitting, is displaced downwardly over the sharp edge 24 of the spike, the lower end portion of the impaled bun enters the confined annular space about the lower end portion of the spike to be engaged by the outer walls of the well which operate to deflect the engaged portion of the bun inwardly against the spike and to confine the bun at its lower edge portions in a manner to prevent separation.

The lower end portions of the impaled bun are received within the annular space between the spike and the walls defining the well to hold the bun in toasting position on the spike in a manner to maintain intimate contact between the inner surfaces of the bun and the heated walls of the spike. Such confinement insures uniform contact for overall toasting of the bun and for maximizing utilization of heat made available from the surface of the spike. Further, the bun is firmly held in a manner to prevent separation even if separation should occur. The confinement available from the described projection of the lower end portion of the spike into the enclosing well enables two separate pieces of a bun or other bread product to be retained in the desired position on opposite sides of the spike to effect toasting, such that the appliance can be employed for toasting separate pieces of a bun or bread product.

Important also is the structural improvement whereby the full length of the spike is available for bun toasting with only a fraction of the spike extending upwardly beyond the top wall of the housing so that less obstruction exists to the freedom of movement and use by an operator and less danger exists of becoming burned by the spike.

It will be apparent from the foregoing that I have provided an improved appliance for the internal toasting of buns and bread products and it will be understood that changes may be made with respect to the details in the dimensional characteristics and shape of the well, and that other changes may be made in the construction, arrangement and operation, without departing from the spirit of the invention, especially as defined in the following claim.

I claim:

1. An appliance for toasting the interior surfaces of buns comprising one or more metal spikes on which the buns are impaled, a housing having a top wall, a recess for each spike extending downwardly from the top wall in the form of a well having a concave bottom wall extending from the forward edge to the rearward edge and means for mounting the spike adjacent the bottom wall of the well with the spike extending upwardly through the well for a distance beyond the top wall with the well being dimensioned cross-sectionally lengthwise and crosswise to be greater than the corresponding cross-sectional dimensions of the spike to provide an annular space all around of about ½ to 1½ inches therebetween with the depth of the well being one-quarter to one-half the height of the spike, an insulator separating the bottom side of the spike from the bottom wall of the well on which the spike is supported, a heating element in the spike having its contacts extending downwardly into the interior of the housing, electrical switch means for each spike for operation between "on" and "off" positions, and electrical connections between said switch means and the heating element and electrical connections between said switch means and a source of electrical energy.

References Cited

UNITED STATES PATENTS

| | | | |
|---|---|---|---|
| 2,776,358 | 1/1957 | Sturr | 99—358 |
| 2,951,434 | 9/1960 | Williams | 99—358 X |
| 1,882,363 | 10/1932 | Keyting | 99—419 X |
| 1,902,564 | 3/1933 | Mabey | 99—419 |
| 1,990,412 | 2/1935 | Merritt | 99—419 X |
| 2,648,275 | 8/1953 | Thompson | 99—419 |
| 2,735,356 | 2/1956 | Sacks | 99—419 X |

FOREIGN PATENTS 350,436  6/1931  Great Britain.

WALTER A. SCHEEL, *Primary Examiner.*

J. M. NEARY, *Assistant Examiner.*